Feb. 19, 1935.   V. L. SMITHERS   1,991,470
METHOD OF MAKING SOLID RUBBER ARTICLES

Filed April 19, 1934

INVENTOR
VERNON L. SMITHERS

BY Ely & Barrow

ATTORNEYS

Patented Feb. 19, 1935

1,991,470

UNITED STATES PATENT OFFICE 1,991,470

METHOD OF MAKING SOLID RUBBER ARTICLES

Vernon L. Smithers, Akron, Ohio

Application April 19, 1934, Serial No. 721,323

1 Claim. (Cl. 18—59)

The present invention relates to the manufacture of solid rubber articles such as balls, rings, toys and the like, and while the process is adaptable for a wide range of objects, it will be described more particularly with reference to the making of solid rubber balls.

The purpose of the invention is to devise a simple process which will adapt itself to the vulcanization of rubber articles by amateurs, it being my object to devise a process which will be usable in the manufacture of these articles as a recreation. There is considerable difficulty in adapting the standard or known commercial practises to the toy or play field in which more or less education is involved, and it has been my object to familiarize those interested in these matters with a rudimentary knowledge of the rubber art, through making of simple articles by methods which can be used in the home or play room.

In the commercial production of balls and other articles of solid rubber it is the practise to make a homogeneous mass or slug of rubber compounded for vulcanization somewhat larger than the mold cavity and, while vulcanization is in progress, to follow up the mold with pressure. The solidity of the article is assured by allowing a sufficient overflow of the stock and this is combined with the "following up" pressure.

Obviously it would be impossible to adapt this method to the facilities such as might be furnished to an amateur. However, by the use of the process here described and shown, simple and even more or less intricate rubber articles may be made by extremely simple operations and with apparatus which can be used in the home.

In the drawing I have illustrated the making of a solid rubber ball, as this is the simplest of articles and may be taken as typical of the process. It will be appreciated also that the process may be employed in many ways not specifically set forth and the invention is not necessarily restricted to the details shown and described.

Figure 1:
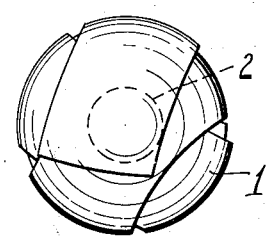
Figure 1 is a side view of a pellet of rubber made roughly in spherical form for insertion in a small ball mold.
Figure 2:
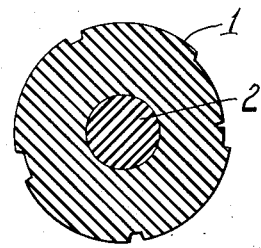
Figure 2 is a cross-section of Figure 1.

Referring to the process illustrated particularly in Figures 1 to 4 inclusive:

The rubber ball is made from a raw rubber stock which is to be furnished to the amateur operator in sheet form. According to the instructions to be given in carrying out the process, a strip or ribbon of this stock is cut from the sheet, of sufficient volume to not quite, but substantially, fill the mold in which the article is to be vulcanized. This stock is represented by the numeral 1.

The worker is also supplied with a second stock which is indicated at 2, and for the purpose of distinguishing the two stocks, they may be colored differently. The worker is instructed to cut a small pellet of this latter stock from the sheet rubber with which he is supplied.

Stock No. 1 is an ordinary rubber stock compounded with any suitable filling ingredients, sulphur and an accelerator if desired. It should be such a stock as will not deteriorate rapidly. Stock No. 2 is a rubber stock which has mixed within it, usually in powdered form, a material which will volatilize under heat and by expansion cause a sufficient expansion of the whole mass to cause the rubber to fill the mold and also to exert sufficient pressure upon the stock 1 so that it will vulcanize as a solid mass. For this purpose sodium bicarbonate, ammonium chloride or other volatile ingredients may be employed. If desired, the expanding, pressure exerting ingredient may be in the form of small pellets without the admixture of any rubber, but it is believed to be preferable to combine this ingredient with rubber as described. It will be appreciated that only a small pill or pellet of the stock 2 is necessary to accomplish the results. It should further be mentioned that the compounding should be such as to give a stock 1 which can be vulcanized rather rapidly with the temperatures ordinarily secured in a domestic oven.

Having cut out the pellet 2, the worker wraps the rubber or sheet of rubber 1 about the pellet until he has built a ball-shaped mass, which is necessarily somewhat irregular in shape. One advantage of the process is that accuracy is not essential, and by crude hand operations it is possible to get satisfactory results. The pellet 2 need not be in the center of the ball or piece. The advantage of wrapping the stock 1 about the pellet is that all the gas is confined within the interior of the ball, and the consequent expansion gives the pressure necessary to the formation of a perfect ball. Were the pellet 2 to be placed between two slabs or strips of rubber there would be a tendency for the gas to escape through the line of separation of the two stocks, which result is prevented by the wrapping operation.

Figure 3:
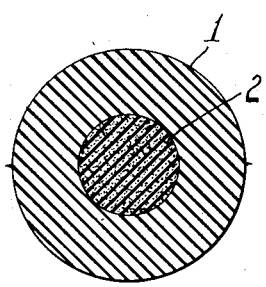
Figure 3 is a view of the finished article.

In Figure 3 the finished ball is shown, it being noted that the pellet 2 has expanded to a small sponge rubber center. If this ball were made as suggested above, using simply a piece of the expanding chemical the space would be hollow and smaller, but the entire ball would have the characteristics of a solid ball.

Figure 4:
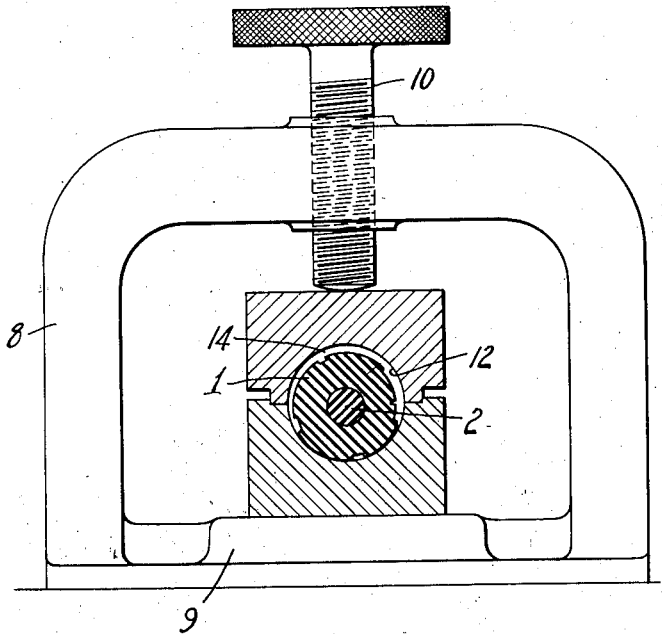
Figure 4 is a view of a simple form of apparatus such as may be used in the home for the vulcanization of the complete article.

In Figure 4 a simple form of apparatus is shown. This is a frame 8 having a bed 9 and a pressure screw 10 above the bed. The mold which is seated on the bed 9 is, of course, of the requisite form to mold the finished article. It consists of upper and lower mold halves in which the cavity 12 is formed. As shown, it is essential that the cavity be slightly greater than the size of the raw stock, a space 14 being shown about the stock in the mold. The worker is instructed to make the piece of raw stock of such size as to almost fill the cavity, but to be certain that the mold is brought into close fitting relation when the pressure is applied. A metal to metal contact about the parting line of the mold is essential to correct results, only a very small amount of rubber finding its way into the crack. This is by no means the usual overflow which is found in commercial practise.

Having assembled the mold in the press in the manner set forth, the worker places the assembly in an oven and proceeds to vulcanize the article, the heat of vulcanization converting the chemical in the interior of the article to gaseous form, whereby the requisite pressure is secured. Exact temperatures are not necessary but should, of course, be high enough to vulcanize the rubber.

Figure 5:
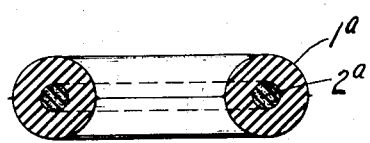
Figure 5 is a cross-section through a ring made in accordance with the invention.

The adaptability of the process to the making of other articles is shown by the ring illustrated in Figure 5. In this case a sheet of rubber of the proper size of the stock 1ᵃ is cut and made into a band. A small string or ribbon of the stock 2ᵃ is laid on the band, and the band is rolled into a ring surrounding the stock 2ᵃ. When placed in a ring shaped mold and the process carried out as set forth, perfect rings may be secured.

It will be apparent that with a little ingenuity, the amateur, having learned the rudiments of the process, may extend his operations into a variety of articles. Dolls, figures of various kinds and shapes may be made. It is, of course, essential in making irregular figures that the expanding material be distributed throughout the stock in such a way that the pressure within the mass will be exerted at the points necessary to cause the stock to fill out the mold cavity. All that the worker will require is sets of molds for the special purposes which he has in mind.

It is believed that by means of the process set forth an interesting and instructive form of amusement is provided. The amateur or juvenile worker will learn the rudiments of vulcanization of rubber, and the interest in this art will be created and fostered. The process is new within and of itself and is particularly adapted for the purpose in view.

What is claimed is:

The process of manufacturing solid rubber articles comprising enclosing a relatively small amount of rubber mixed with a material expansible at the heat of vulcanization in the interior of a body of compounded rubber stock, the raw material being in a solid mass, placing a mass of the material thus assembled in a mold having a volume slightly greater than the volume of the rubber, the amount of rubber which is mixed with the expansible material being sufficient merely to cause the whole mass to fill the mold on vulcanization, closing the mold with a metal to metal contact above the division line, and vulcanizing the contents of the mold while retaining the sections of the mold in close contacting relation so that escape of any substantial portion of the rubber is prevented, whereby the expansible material will exert a compacting pressure upon the surrounding stock and cause it to expand and be compacted against the inner surface of the mold, and the finished article will be without appreciable rind.

VERNON L. SMITHERS.